Patented July 26, 1938

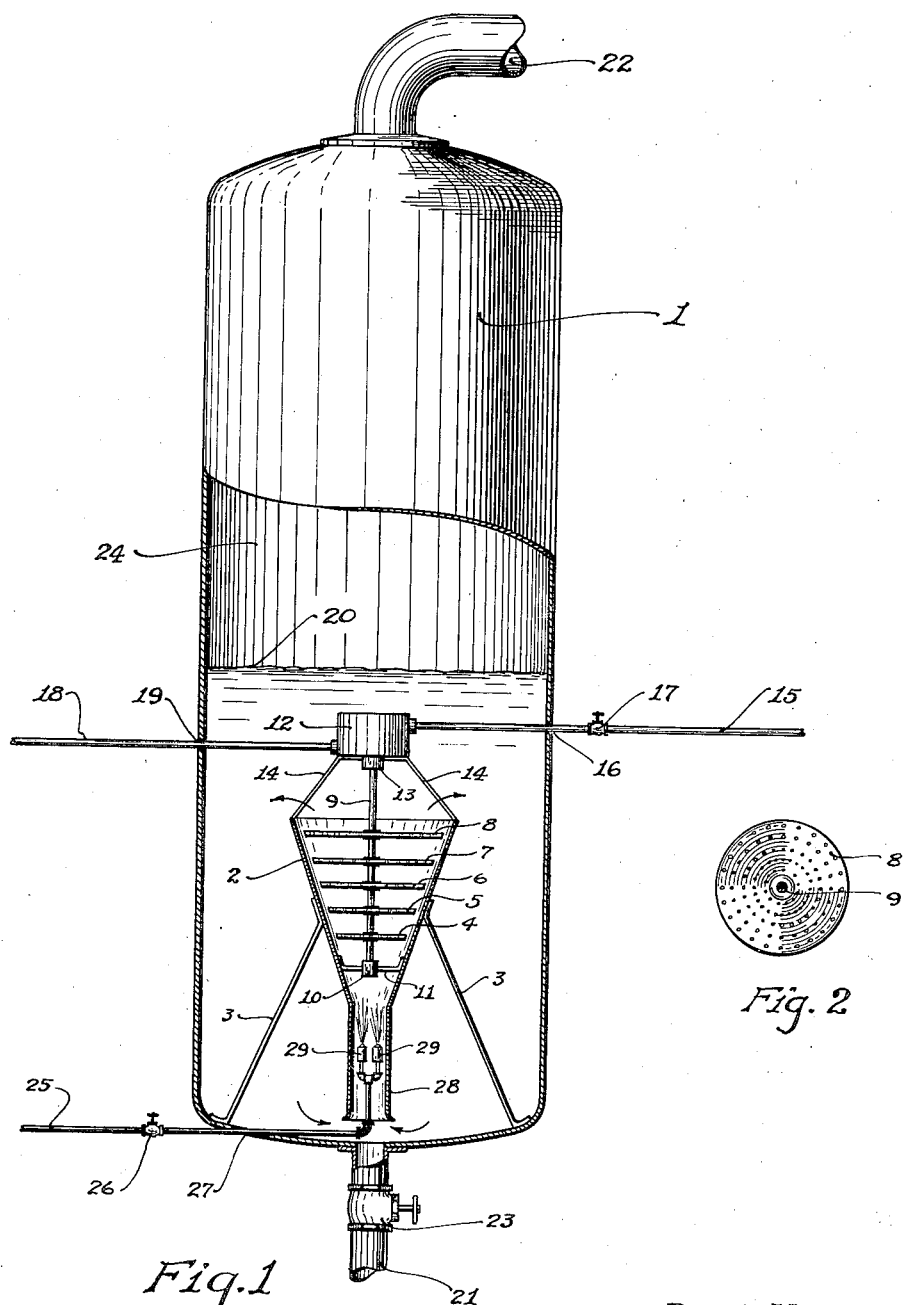

2,124,707

UNITED STATES PATENT OFFICE 2,124,707

OIL AND FAT DEODORIZATION

Roy C. Newton and Walter F. Bollens, Chicago, Ill., assignors to Industrial Patents Corporation, Chicago, Ill., a corporation of Delaware Application October 11, 1935, Serial No. 44,503

6 Claims. (Cl. 87—12)

This invention relates to the deodorization of oils and fats.

One of the objects of the invention is to provide means for deodorizing oils and fats.

Another object of the invention is to provide means for the more efficient and economical deodorization of oils and fats.

Another object of the invention is to increase the effective surface of gases passed through a body of oil for the purpose of removing volatile impurities.

It is customary in the treatment of edible oils and fats to place the material in a deodorizer. The deodorizer ordinarily employed in practice is a cylindrical tank placed in an upright position. The charge of oil or fat may be placed in the tank through an appropriate opening in the top, or, as is more usually the case, may be drawn in through an opening in the bottom by a vacuum pulled on the tank by an appropriate atmospheric condenser, communicating with the deodorizer through a line leading from the top of the tank.

After the charge has been placed in the deodorizer, a valve interposed in the line leading from the bottom of the tank is closed and steam is admitted at the bottom of the tank. Steam passes up through the oil through the head space above from which it is drawn off by the atmospheric condenser carrying with it the impurities and volatile odoriferous substances and gases.

From the standpoint of expense and efficiency of plant equipment, the two important factors in the deodorization of oils are the capacity of the equipment, which is distinctly a time element, and the quantity of steam utilized to effect the desired deodorization. An increase in capacity by reduction of time necessary for deodorization or a reduction in the quantity of steam utilized represents a distinct saving.

The present invention contemplates an increase in capacity of existing equipment and a substantial reduction in the quantity of steam utilized to effect deodorization of a given charge of oil.

A preferred embodiment of the apparatus aspect of the present invention is disclosed in the drawing.

Figure 1 is a perspective view, partly in section, of a deodorizer constructed in accordance with the present invention.

Figure 2 is a plan view of a perforated disc of the type utilized in the apparatus shown in Figure 1.

It will be seen by referring to the drawing that tank 1 is placed in an upright position. Cone 2 forms a restricted passage and is made of any suitable metal and rigidly held at the center of the bottom of tank 1 by brackets 3 affixed to the inner surface of the bottom of the tank. Sustained within cone 2 are a series of perforated discs as 4, 5, 6, 7, and 8 of progressively increasing diameter. The discs are mounted on shaft 9 which rides on an appropriate bearing 10, held by brackets 11. Shaft 9 is driven by steam turbine 12 and is journaled in bearing 13. Steam turbine 12 is rigidly affixed to bracket 14, attached to cone 2. Turbine 12 is provided with steam through line 15 passing through the wall of tank 1 at 16, and provided with valve 17 to control the admission of steam. Steam passing from turbine 12 is carried away through line 18 which passes through the wall of tank 1 at 19.

After a charge of oil, as 20, is drawn through line 21 by means of a vacuum pulled through line 22, the valve 23 is closed, whereby the charge of oil 20 is retained in deodorizer 1. Vacuum is maintained in the head space 24 by an atmospheric condenser, not shown, to which line 22 leads. After the deodorizer is loaded with a charge of oil 20, the gaseous deodorizing medium, as for example steam, is admitted through line 25 in which is interposed the valve 26 to control the flow of steam. Line 25 enters tank 1 at 27 and terminates within neck 28 of cone 2.

Steam jets 29 are mounted at the terminus of line 25 within the neck 28 of cone 2. The perforated discs mounted on shaft 9 are rapidly rotated and serve to break up the steam into finely dispersed bubbles, thus greatly increasing the effective surface of the steam bubbles in proportion to steam volume.

The smaller bubbles thus formed arise more slowly through the oil and make the surface available for a longer period of time.

In experimental work to determine the effect of thus breaking the gaseous medium into finely dispersed bubbles the following data was secured in an apparatus in which the bubbles traveled through the oil a distance of 113 centimeters, the oil being at a temperature of 27° centigrade.

In the following table the volume of the bubble was of necessity measured at 27° C. and at a pressure of 113 centimeters of oil above atmospheric pressure.

| Vol. of bubble, cm.$^3$ | Surface of bubble (spherical), cm.$^2$ | Time to rise through 113 cm. of oil, sec. |
|---|---|---|
| 0.01 | 0.225 | 15.0 |
| 0.1 | 1.042 | 6.6 |
| 0.5 | 3.046 | 6.0 |
| 1.0 | 4.836 | 5.4 |
| 2.0 | 7.677 | 5.1 |
| 3.0 | 10.06 | 4.9 |

As a result of our work we have accumulated data from which we have calculated the effectiveness of a given volume of gas when it is divided into bubbles of various sizes. In these calculations we have taken the surface of a 1 cc. bubble as 1.0 and the time for it to rise through the oil as 1.0. The calculations are set out in the table below:

| Size of bubble, cm.³ | Comparative surface of one cc. of gas divided into bubbles of a given size. Surface of a 1.0 cc. bubble=1.0 | Comparative time for bubbles of given size to rise through 113 cm. of oil. Time for a 1 cc. bubble=1.0 | Comparative surface × time |
|---|---|---|---|
| 0.01 | 4.65 | 2.78 | 12.9 |
| 0.1 | 2.15 | 1.11 | 2.4 |
| 0.5 | 1.26 | 1.1 | 1.4 |
| 1.0 | 1.00 | 1.0 | 1.0 |
| 2.0 | 0.79 | 0.94 | 0.74 |
| 3.0 | 0.69 | 0.90 | 0.62 |

Since the effectiveness of a gas as a deodorizing medium is dependent upon the factors of surface and of time, it will be seen that a given volume of steam divided into 0.01 cc. bubbles would be 12.9 times as effective as if divided into 1.0 cc. bubbles, and 20.8 times as effective as if divided into 3.0 cc. bubbles.

A curve showing relationship of the size of a bubble to its surface times time illustrates that the surface times time increases very rapidly as the bubble decreases in size, especially below 0.01 cc. The greatly increased efficiency of the gaseous medium when utilized in bubbles below 0.01 cc. renders it possible to lower the high vacuum heretofore thought necessary and thus bring about still further economy in the operation of the conventional deodorizer.

In the conventional deodorizer, the steam enters and passes through the oil in large units. The passage is rapid and very little surface is presented to the oil in proportion to the quantity of steam. In the device of the present invention, most of the effective steam is divided into bubbles less than 0.01 cc. in size.

The experimental data heretofore set out in this specification was secured from experiments made upon a laboratory scale in order that exact measurements might be made. It will be understood, of course, that the theory of the present invention holds true irrespective of the initial or final size of the gas bubble which is to be disintegrated, and the effectiveness of the gas will be increased by a reduction in bubble size, and in the claims, "small", as used in respect to bubbles, will be understood as substantially smaller bubbles than can be secured by emitting steam or gas directly into the oil through a spider with the conventional 1/16 inch or 1/8 inch holes.

It will be apparent that various modifications may be made in the light of the foregoing teaching without departing from the spirit of the following claims.

The term "oil" as used in the claims which follow, is used in the broad sense as including fat and other oleaginous substances.

We claim:

1. A deodorizer comprising a vessel, said vessel having an oil inlet and outlet, and a gas outlet, means for admitting a gaseous medium to said vessel, the point of escape of the gaseous medium within said vessel being positioned near the bottom of said vessel within a restricted passage open at the ends, the uppermost end of said restricted passage being suitably spaced from and below the top of said vessel and beneath the oil level and means including a rotatable perforated disc mounted within said restricted passage above the point of escape of the gaseous medium for disintegrating the gaseous medium into small bubbles within the body of oil.

2. A deodorizer comprising a vessel, said vessel having an oil inlet and outlet, and a gas outlet, means for admitting a gaseous medium to said vessel, the point of escape of the gaseous medium within said vessel being positioned near the bottom of said vessel within a restricted passage open at the ends, the uppermost end of said restricted passage being suitably spaced from and below the top of said vessel and beneath the oil level and means in said restricted passage above the point of escape of the gaseous medium for disintegrating the gaseous medium into small bubbles within the body of oil, said means for disintegrating the gaseous medium comprising a plurality of perforated discs mounted upon a shaft and rotatable thereby.

3. A deodorizer comprising a vessel, said vessel having an oil inlet and outlet, and a gas outlet, means for admitting a gaseous medium to said vessel, the point of escape of the gaseous medium within said vessel being positioned near the bottom of said vessel within a restricted passage open at the ends, the uppermost end of said restricted passage being suitably spaced from and below the top of said vessel and beneath the oil level and means in said restricted passage above the point of escape of the gaseous medium for disintegrating the gaseous medium into small bubbles within the body of oil, said means for disintegrating the gaseous medium comprising a plurality of perforated discs mounted upon a shaft and rotatable thereby, and means for driving said shaft.

4. A deodorizer comprising a vessel, said vessel having an oil inlet and outlet, and a gas outlet, means for admitting a gaseous medium to said vessel, the point of escape of the gaseous medium within said vessel being positioned near the bottom of said vessel within a restricted passage open at the ends, both ends of said restricted passage being beneath the oil level and means in said restricted passage above the point of escape of the gaseous medium for disintegrating the gaseous medium into small bubbles within the body of oil, said means for disintegrating the gaseous medium comprising a plurality of perforated discs mounted upon a shaft and rotatable thereby, and a turbine operatively connected with said shaft for revolving said discs.

5. In a deodorizer an open ended upwardly flaring cone terminating at the bottom in an elongated neck, means for introducing a gaseous medium in said neck and a plurality of perforated plates mounted upon a rotatable shaft positioned within said cone whereby said gaseous medium may be disintegrated into small bubbles during passage upwardly through the cone within the mass of oil.

6. A deodorizer comprising a vessel having an oil inlet and outlet, and a gas outlet, a restricted passage open at both ends mounted upright within the vessel in the lower portion thereof, means for admitting a gaseous medium to the vessel, the point of escape of the gaseous medium within the vessel being positioned within the restricted passage and a perforated rotatable disc mounted within the restricted passage and above the point of escape of the gaseous medium to disintegrate the gaseous medium into small bubbles within a body of oil within the vessel.

ROY C. NEWTON.
WALTER F. BOLLENS.